US010075902B2

(12) United States Patent
Gogic

(10) Patent No.: US 10,075,902 B2
(45) Date of Patent: Sep. 11, 2018

(54) METHOD OF UNIFIED CONTROL OF RANDOM ACCESS AND TRAFFIC INGRESS IN A CONGESTED RADIO ACCESS NETWORK

(71) Applicant: QUALCOMM Incorporated, San Diego, CA (US)

(72) Inventor: Aleksandar Gogic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/679,810

(22) Filed: Apr. 6, 2015

(65) Prior Publication Data

US 2015/0289195 A1    Oct. 8, 2015

Related U.S. Application Data

(60) Provisional application No. 61/976,867, filed on Apr. 8, 2014.

(51) Int. Cl.
*H04W 48/06* (2009.01)
*H04W 74/08* (2009.01)
(Continued)

(52) U.S. Cl.
CPC ........... *H04W 48/06* (2013.01); *H04W 24/08* (2013.01); *H04W 74/0833* (2013.01);
(Continued)

(58) Field of Classification Search
CPC . H04W 48/06; H04W 24/08; H04W 74/0833; H04W 48/12; H04W 48/16; H04L 47/14; H04L 47/2475
See application file for complete search history.

(56) References Cited

U.S. PATENT DOCUMENTS

2012/0002614 A1 * 1/2012 Ekici ..................... H04W 48/18
370/329
2012/0040643 A1 2/2012 Diachina et al.
(Continued)

FOREIGN PATENT DOCUMENTS

EP         2876938 A1    5/2015
WO    WO-2014014056 A1    1/2014
WO    WO-2014042462 A1    3/2014

OTHER PUBLICATIONS

3GPP, "3rd Generation Partnership Project; Technical Specification Group Services and System Aspects; Study on Application Specific Congestion Control for Data Communication (Release 13)," 3GPP TR 22.806 V0.4.0 (Nov. 2013), Nov. 2013, pp. 1-26, XP_50763914A, 3rd Generation Partnership Project.
(Continued)

*Primary Examiner* — Lonnie V Sweet
(74) *Attorney, Agent, or Firm* — Holland & Hart LLP/Qualcomm

(57) ABSTRACT

Application category-level access control for random access and traffic ingress using a joint control signal. The joint control signal may include application category access controls as well as an indication of applicability, which may indicate the connection states for which the access controls apply. The indication of applicability may also indicate the cause of access control. The indication of applicability may apply to all application category access controls, groups of application category access controls, or there may be separate indication of applicability for each application category access control. Resources may be conserved by using a single set of application category access controls for UEs in multiple connection states. The joint access controls may be transmitted to the UEs using signals such as SIBs.

29 Claims, 11 Drawing Sheets

(51) Int. Cl.
   *H04W 24/08*   (2009.01)
   *H04W 48/12*   (2009.01)
   *H04W 48/16*   (2009.01)
   *H04W 28/02*   (2009.01)
   *H04L 12/859*  (2013.01)
   *H04L 12/801*  (2013.01)

(52) U.S. Cl.
   CPC .......... *H04L 47/14* (2013.01); *H04L 47/2475* (2013.01); *H04W 28/0205* (2013.01); *H04W 48/12* (2013.01); *H04W 48/16* (2013.01)

(56) References Cited

U.S. PATENT DOCUMENTS

| | | | | |
|---|---|---|---|---|
| 2013/0166790 A1* | 6/2013 | Lee | ....................... | G06F 13/105 710/17 |
| 2014/0010180 A1* | 1/2014 | Lee | ....................... | H04W 48/02 370/329 |
| 2014/0073335 A1* | 3/2014 | Panchal | .................. | H04W 4/00 455/450 |
| 2014/0136709 A1* | 5/2014 | Chin | ....................... | H04W 4/12 709/226 |
| 2014/0329529 A1* | 11/2014 | Jung | ..................... | H04W 36/16 455/436 |
| 2015/0036489 A1* | 2/2015 | Rajadurai | ......... | H04W 28/0205 370/230 |

OTHER PUBLICATIONS

ISA/EPO, International Search Report and Written Opinion of the International Searching Authority, Int'l Appl. No. PCT/US2015/024620, dated Jul. 7, 2015, European Patent Office, Rijswijk, NL, 14 pgs.

QUACOMM Incorporated, "ACDC System Overview," 3GPP TSG-SA WG1 #65, S1-140109, Taipei, Taiwan, China, Jan. 20-24, 2014, 15 pgs., XP_50743514A, 3rd Generation Partnership Project.

* cited by examiner

METHOD OF UNIFIED CONTROL OF RANDOM ACCESS AND TRAFFIC INGRESS IN A CONGESTED RADIO ACCESS NETWORK

CROSS REFERENCES

The present Application for Patent claims priority to U.S. Provisional Patent Application No. 61/976,867 by Gogic et al., entitled "method of Unified Control of Random Access and Traffic Ingress in a Congested Radio Access Network," filed Apr. 8, 2014, assigned to the assignee hereof, and expressly incorporated by reference herein.

BACKGROUND

The following relates generally to wireless communication, and more specifically to access control. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless communication network may include a number of base stations, NodeBs, or eNodeBs (eNBs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A UE may use a random access procedure when establishing or re-establishing a connection with an eNB. The random access procedure may include transmission of a random access preamble using a Physical Random Access Channel (PRACH). At some times, such as during emergencies, base stations may become overloaded with random access requests and may be unable to detect random access requests because of high interference on the PRACH. Similarly, overall traffic load in either uplink or downlink may be too high causing many request rejections. Reducing random access requests or overall traffic load while allowing access for users attempting to make important or critical communications can present challenges in multiple access environments.

SUMMARY

The described features generally relate to one or more improved systems, methods, and/or apparatuses for application category-level access control for random access and traffic ingress using a joint control signal. The joint control signal may include application category access controls as well as an indication of applicability, which may indicate the connection states (e.g., idle state, connected state, etc.) for which the access controls apply. Additionally or alternatively, the indication of applicability may indicate the cause of access control (e.g., PRACH overload, excessive traffic on the eNB, etc.). Resources may be conserved by using a single set of application category access controls for UEs in a connected state, an idle state, or both, and controlling application of the access controls via the indication of applicability. The joint access controls may be transmitted to the UEs using signals such as System Information Blocks (SIBs).

The indication of applicability may apply to all application category access controls, groups of application category access controls, or there may be separate indication of applicability for each application category access control. The application category access controls may include a barring rate and a mean duration of access control. The barring rate may be a value which affects the probability that an application will be initiated. The barring rate may be binary (e.g., indicate allowed or barred) or it may have numerous different values, such as linked to probabilities of initiation which fall between allowing and barring initiation. If an application is not allowed to initiate it may be barred or it may be deferred. If an application is deferred, it may be deferred for a barring time period that may be determined based at least in part on the mean duration of access control included in the access controls.

In some examples, a method for access control using a joint control signal includes receiving a joint control signal including access controls for a plurality of application categories and at least one indication of applicability of the access controls to at least one UE connection state, determining an intent to initiate an application belonging to at least one of the plurality of application categories for performing a communication operation on the wireless communications network, and determining whether to allow or bar initiation of the application based at least in part on the access controls and the at least one indication of applicability.

In some examples, an apparatus for access control using a joint control signal includes a processor, memory in electronic communication with the processor, and instructions stored in the memory. The instructions may be executable by the processor to receive a joint control signal including access controls for a plurality of application categories and at least one indication of applicability of the access controls to at least one UE connection state, determine an intent to initiate an application belonging to at least one of the plurality of application categories for performing a communication operation on the wireless communications network, and determine whether to allow or bar initiation of the application based at least in part on the access controls and the at least one indication of applicability.

In some examples, a system for access control using a joint control signal includes means for receiving a joint control signal including access controls for a plurality of application categories and at least one indication of applicability of the access controls to at least one UE connection state, means for determining an intent to initiate an application belonging to at least one of the plurality of application categories for performing a communication operation on the wireless communications network, and means for determining whether to allow or bar initiation of the application based at least in part on the access controls and the at least one indication of applicability.

In some examples, a computer-program product for access control using a joint control signal includes a non-transitory computer-readable medium storing code for receiving a joint control signal including access controls for a plurality of application categories and at least one indication of applicability of the access controls to at least one UE connection state, determining an intent to initiate an application belonging to at least one of the plurality of application categories for performing a communication operation on the wireless communications network, and determining whether to allow or bar initiation of the application based at least in part on the access controls and the at least one indication of applicability.

In certain examples of the method, apparatus, system, and/or computer program product, determining whether to allow or bar initiation of the application includes determining that the at least one indication of applicability indicates applicability of an access control associated with an application category for the application for a current UE connection state, and determining whether to allow or bar initiation of the application based at least in part on the access control. The access controls may include at least one of a barring rate, a mean duration of access control, or a combination thereof. In some examples, determining whether to allow or bar initiation of the application includes determining a random barring number, and determining to bar initiation of the application based on determining that the random barring number exceeds the barring rate for the application category. Additionally or alternatively, determining whether to allow or bar initiation of the application may include determining a random barring number, and determining to allow initiation of the application based on determining that the random barring number is less than the barring rate for the application category.

Various examples of the method, apparatus, system, and/or computer-program product may include the features of, processor-executable instructions for, means for, and/or code for determining a barring time period for the application based at least in part on the mean duration of access control, and performing a deferred initiation operation for initiation of the application after elapse of the barring time period. The deferred initiation operation may include determining whether to allow or bar initiation of the application after elapse of the barring time period based at least in part on the access control. In some cases, the barring rate includes one set of control bits indicating a barring rate value for the plurality of application categories. In some examples, the barring rate includes a plurality of sets of control bits each indicating a barring rate value for one of the plurality of application categories.

In certain examples of the method, apparatus, system, and/or computer program product, determining whether to allow or bar initiation of the application includes allowing initiation of the application based at least in part on determining that the at least one indication of applicability indicates non-applicability for an access control associated with an application category for the application for a current UE connection state. The at least one indication of applicability may include one set of control bits indicating applicability of the access controls to the at least one UE connection state for the plurality of application categories. In some examples, the at least one indication of applicability includes a plurality of sets of control bits each indicating applicability of the access controls to the at least one UE connection state for one of the plurality of application categories. In some cases, the at least one UE connection state includes at least one of a connected state or an idle state, or a combination thereof.

In certain examples of the method, apparatus, system, and/or computer program product, the joint control signal is used for application specific congestion control for data communications (ACDC) and prevention of mobile originated communication (PMOC). In some examples, determining the intent to initiate the application includes receiving user input indicating the intent to initiate the application. The joint control signal may be received within a system information block (SIB).

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
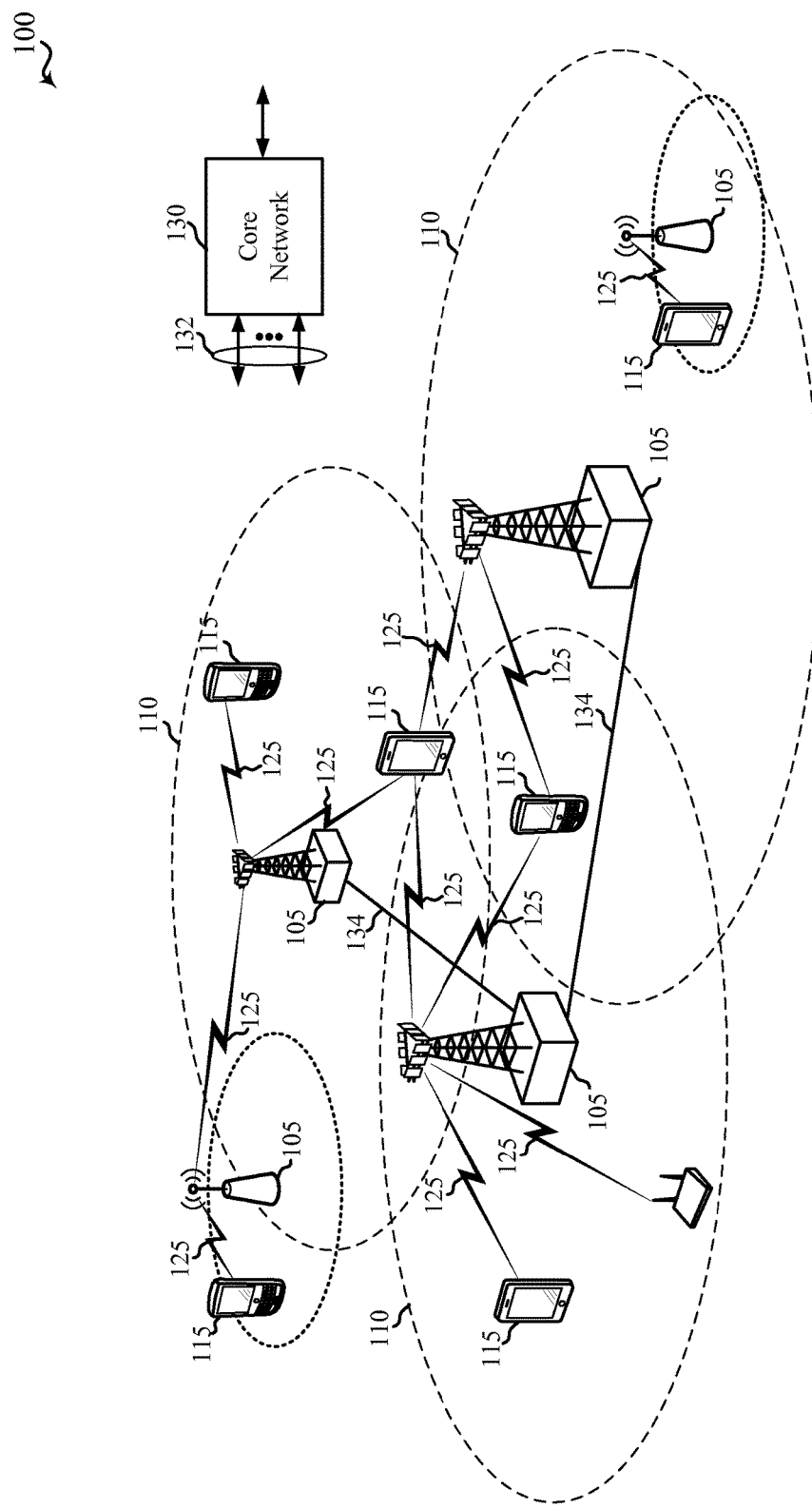
FIG. 1 shows a wireless communications system.

Access control may be desired to alleviate congestion of physical resources of base stations (e.g., eNBs) while not inhibiting important communications. UE-level access controls may be too broad as many devices may share the same level of access control. Access control may be applied at the application level by grouping applications together with other applications having a similar network access priority to form application categories. Access controls may be specified for each of the application categories. While application category-level access control may allow an eNB to more efficiently use resources, at times UEs are overly restricted. For example, high numbers of UEs attempting to perform random access may cause congestion of physical random access resources. At other times, the eNB may have available resources for access requests, yet have a high overall traffic load from UEs exchanging data with the eNB.

The described examples include one or more improved systems, methods, and/or apparatuses for application category-level access control for random access and traffic ingress using a joint control signal. The joint control signal may include application category access controls as well as an indication of applicability, which may indicate the connection states (e.g., idle state, connected state, etc.) for which the access controls apply. Additionally or alternatively, the indication of applicability may indicate the cause of access control (e.g., PRACH overload, excessive traffic on the eNB, etc.). Resources may be conserved by using a single set of application category access controls for UEs in a connected state, an idle state, or both, and controlling application of the access controls via the indication of applicability. The joint access controls may be transmitted to the UEs using signals such as SIBs.

The indication of applicability may apply to all application category access controls, groups of application category access controls, or there may be separate indication of applicability for each application category access control. The application category access controls may include a barring rate and a mean duration of access control. The barring rate may be a value which affects the probability that an application will be initiated. The barring rate may be binary (e.g., indicate allowed or barred) or it may have numerous different values, such as linked to probabilities of initiation which fall between allowing and barring initiation. If an application is not allowed to initiate it may be barred or it may be deferred. If an application is deferred, it may be deferred for a barring time period that may be determined based at least in part on the mean duration of access control included in the access controls.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various examples. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In some cases, the base stations 105 may communicate, either directly or indirectly, with each other over backhaul links 134, which may be wired or wireless communication links.

The base stations 105 may wirelessly communicate with the devices 115 over communication links 125 using one or more base station antennas. Each of the base station 105 sites may provide communication coverage for a respective coverage area 110. In some cases, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The term "cell" is a 3GPP term that can be used to describe carriers at a base station or a coverage area (e.g., sector, etc.) of a base station. For example, with carrier aggregation, the term cell may refer to a downlink-uplink carrier pair or an additional downlink component carrier. The system 100 may include more than one Radio Access Network (RAN) and may employ different Radio Access Technologies (RATs). In some cases, base stations 105 of different RATs may be colocated. Thus, there may be overlapping coverage areas for different technologies.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The communication devices 115 are dispersed throughout the wireless network 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment (UE), a mobile client, a client, or some other suitable terminology. A communication device 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

The system 100 may support operation on multiple carriers or subcarriers (waveform signals of different frequencies). Multi-carrier transmitters can transmit modulated signals simultaneously on the multiple subcarriers. For example, each communication link 125 may be a multi-carrier signal modulated according to the various radio technologies described above. Each modulated signal may be sent on a different subcarrier and may carry control information (e.g., reference signals, control channels, etc.), overhead information, data, etc.

In examples, the system 100 includes an LTE/LTE-A network. In LTE/LTE-A networks, the terms evolved Node B (eNB) and user equipment (UE) may be generally used to describe the base stations 105 and communication devices 115, respectively. For example, the system 100 may include a Heterogeneous LTE/LTE-A network in which different types of eNBs provide coverage for various geographical regions. For example, each eNB 105 may provide communication coverage for a macro cell, a pico cell, a femto cell, a small cell, and/or other types of cell. A macro cell generally covers a relatively large geographic area (e.g., several kilometers in radius) while a pico or small cell would generally cover a relatively smaller geographic area. Macro cells and pico cells may allow unrestricted access by UEs with service subscriptions with the network provider. A femto cell would also generally cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

A wireless system according to an LTE/LTE-A network architecture may be referred to as an Evolved Packet System (EPS). The EPS may include UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, the EPS may interconnect with a UTRAN-based network and/or a CDMA-based network via one or more Serving GPRS Support Nodes (SGSNs). To support mobility of UEs 115 and/or load balancing, the EPS may support intra-RAT handover between LTE/LTE-A eNBs 105, and inter-RAT handovers between LTE/LTE-A eNBs 105 and base stations 105 of different RATs (e.g., E-UTRAN to CDMA, etc.). The EPS may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130. Logical nodes within EPC 130 may include one or more Mobility Management Entities (MMES), one or more Serving Gateways, and one or more Packet Data Network (PDN) Gateways (not shown). Generally, the MME may provide bearer and connection management. All user IP packets may be routed through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, a content delivery network (CDN), and/or a packet-switched multimedia streaming service (e.g., an IP Multimedia Subsystem (IMS), a Packet-Switched Streaming Service (PSS), etc.).

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. The "rank" of the communication link may indicate the number of data streams used for communication. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The downlink physical channels may include at least one of a physical downlink control channel (PDCCH), a physical HARQ indicator channel (PHICH), and a physical downlink shared channel (PDSCH). The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit only data or both data and control information in the PUSCH on the assigned resource blocks in the data section.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Time intervals may be expressed in multiples of a basic time unit $T_s=1/30720000$. Each frame structure may have a radio frame length $T_f=307200 \cdot T_s=10$ ms and may include two half-frames or slots of length $153600 \cdot T_s=5$ ms each. Each half-frame may include five subframes of length $30720 \cdot T_s=1$ ms.

Wireless network 100 may support operation on multiple carriers, which may be referred to as carrier aggregation (CA) or multi-carrier operation. A carrier may also be referred to as a component carrier (CC), a layer, a channel, etc. The terms "carrier," "layer," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for carrier aggregation. Multi-layer eNBs 105 may be configured to support communications with UEs over multiple CCs on the downlink and/or uplink. Thus, a UE 115 may receive data and control information on one or more downlink CCs from one multi-layer eNB 105 or from multiple eNBs 105 (e.g., single or multi-layer eNBs). The UE 115 may transmit data and control information on one or more uplink CCs to eNBs 105. Carrier aggregation may be used with both FDD and TDD component carriers.

UEs 115 in the wireless network 100 may have different connection states. UEs 115 may be in an idle state (such as RRC_IDLE) or a connected state (such as RRC_CONNECTED). UEs 115 in an idle state may receive signals, such as synchronization signals (e.g., primary synchronization signal (PSS), secondary synchronization signal (SSS), etc.), reference signals (e.g., common reference signals (CRS)), system information (system information blocks (SIBs), etc.), paging messages, and the like, from an eNB 105, but generally do not exchange application data with the eNB 105. UEs 115 in a connected state may receive the signaling received by UEs in the idle state described above, and may receive additional signals or channels from the eNB 105 (e.g., UE-specific reference signals, demodulation reference signals (DM-RS), etc.). UEs 115 in a connected state may also exchange parameters necessary for communication of application data. For example, the UE 115 and eNB 105 may exchange parameters for using control channels to signal resource allocations as part of establishing a connection. UEs 115 may transition from an idle state to a connected state, and from a connected state to an idle state.

In some situations, an eNB 105 may receive a high number of access requests (e.g., RACH requests) in a short time period and high interference in channels used for access requests may inhibit the eNB 105 from correctly receiving the requests. Similarly, an eNB 105 may have a high overall traffic load, in uplink and/or downlink, that inhibits the ability of the eNB 105 to respond to service requests. For example, when an eNB 105 is overloaded many service requests from UEs 115 may be rejected by the eNB 105. Further, an eNB 105 may require resources to determine which requests to grant and/or reject, adding to the problem. Access controls may be used to reduce traffic and prevent eNBs 105 from becoming overloaded. An eNB 105 may transmit access controls to UEs 115 to instruct the UEs 115 to perform procedures to limit or delay access requests or requests for data transmissions. When the UE 115 performs these access control procedures prior to requesting resources, it frees resources which the eNB 105 might use to determine how to share resources when overloading occurs. Further, it bars or delays some traffic, allowing the eNB 105 to properly address the traffic and requests that it is currently serving to alleviate the overloading condition.

Figure 2:
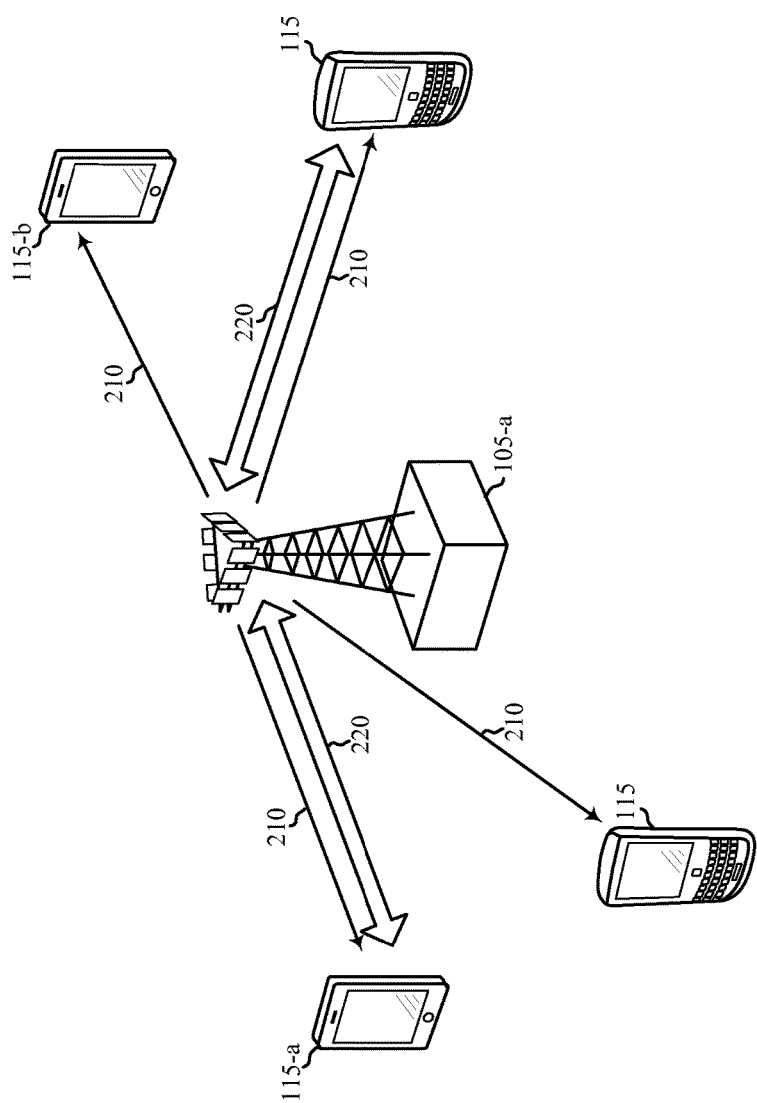
FIG. 2 shows a system including devices in an idle state and a connected state in accordance with various aspects of the disclosure.

FIG. 2 shows a system 200 including UEs 115 served by eNB 105-a in accordance with various aspects of the disclosure. FIG. 2 shows communication between UEs 115 and an eNB 105-a, which may be examples of the UEs 115 and eNBs 105 of FIG. 1. There may be UEs 115 of different connected states (e.g., RRC_CONNECTED or RRC_IDLE) within the coverage area of an eNB 105-a. UEs 115 in an idle state (e.g., RRC_IDLE) may receive broadcast system acquisition and timing signals 210 from the eNB 105-a without having an established data connection link 220 with the eNB 105-a. In some cases, these signals 210 may include reference signals, synchronization signals, system information signals, paging messaging, and the like. In addition to receiving broadcast system acquisition and timing signals 210, UEs 115 in a connected state (i.e., RRC_CONNECTED) may have established data connection links 220 with the eNB 105-a, and are configured to receive resource grants and exchange data over data channels (e.g., PDSCH, PUSCH, etc.) of the carriers. As illustrated in FIG. 2, system 200 includes UE 115-b in the idle state and UE 115-a in the connected state.

A UE 115 in the idle state (e.g., UE 115-b) may transition to a connected state, such as by using a random access procedure over a physical random access channel (PRACH) of the eNB 105-a. In some cases, the random access procedure includes transmitting a random access preamble to the eNB 105-a and receiving a random access response from the eNB 105-a. The random access procedure may be initiated by the startup or use of an application at the UE 115-b which exchanges data with a network (e.g., the Internet) accessed via the eNB 105-a. As illustrated in FIG. 2, system 200 may also include UEs 115 in the connected state (e.g., UE 115-a). UEs 115 in the connected state may transition to the idle state after a predetermined time period where no data is exchanged with the eNB 105-a. While the system 200 is shown with only two UEs 115 in a connected state and two UEs 115 in an idle state, it should be appreciated that the system 200 may have more or fewer UEs in the idle state or connected state at any given time.

At times, the eNB 105-a may use access controls to reduce access requests (e.g., via PRACH, etc.). Various networks employ UE-level access control by access class barring (ACB). Limiting access requests may inhibit the ability for UEs 115 in the idle state to perform an access request. For example, UEs 115 may be assigned to an access class (AC), and the network may transmit barring information for various classes. For example, ACs 0-15 may be defined. ACs 0-9 may be assigned to each UE, and may apply regardless of whether the UE is in the home or visited public land mobile network (PLMN); while ACs 11-15 may be assigned to special subscription UEs (e.g., police, emergency services, public services, network operator, etc.), and may apply only when the UE is in its home public land mobile network (HPLMN). The eNB 105-a may transmit ACB information (e.g., barring rate and mean duration of access control) that applies commonly to ACs 0-9. The eNB 105-a may also transmit access controls that indicate whether UEs in ACs 11-15 shall apply ACB. The eNB 105-a may transmit separate ACB controls for different types of access (e.g., emergency calls, mobile originating signaling, mobile originating data, etc.). Thus, access control such as mean duration of access control and barring rate may be broadcast by the eNB 105-a for each type of access attempt (e.g., emergency calls, mobile originating data, mobile originating signaling). While ACB based access control can alleviate some types of congestion on access resources, most UEs are within the same access class group (e.g., ACs 0-9) and the access controls for different types of communication for AC barring only provide coarse differentiation (e.g., mobile originating signaling vs. mobile originating data, etc.). Therefore, AC barring may not be able to prioritize access for UEs of the same AC and access type.

Application specific congestion control for data communications (ACDC) attempts to provide finer grained access control by using application category-specific access controls for random access. Whereas ACB applies equally on all ordinary UEs 115 (e.g., ACs 0-9), regardless of the purpose of an access attempt from a UE 115, ACDC groups applications in categories of importance, and applies access controls to lesser categories first, sparing more important applications from denial or deferral of access until and unless the level of congestion is severe enough that they must also be affected. Application categories may group applications with similar network priorities. In some cases, application categories may contain an inherent hierarchy, where each subsequent category is prioritized less than the previous. For example, if there are N categories, category 1 might be the highest priority category, while category N might be the lowest priority category. Access controls may be indicated for each category. As such, applications that are considered high priority by the network may have a greater chance of initiating than applications that belong to a lower priority category. For example, voice calls may be considered a higher priority than a calendar application. At times, applications are already categorized by the time a UE 115 is used for the first time upon activation. In some cases, any application subsequently downloaded by an end user is automatically considered to be a part of the lowest priority application category (e.g., category N). Application categories may further be determined by the network periodically, or when prompted. Like ACB, ACDC is employed to address congestion on random access resources (e.g., PRACH).

As UEs have transitioned from a use model of fewer, longer active sessions (e.g., voice calls, etc.) to a larger number of applications performing data transfers intermittently (e.g., messaging, social networking, location-aware applications, mobile payments, etc.), state transitions have caused an increase in system overhead. One way of combating negative effects of excessive state transition signaling is for UEs 115 to remain in a connected state for longer periods of time. However, this may reduce the efficacy of ACDC as there may be a large number of UEs 115 that are in a connected state where ACDC controls do not apply. This may create a situation where a large number of UEs 115 in a connected state attempt to exchange data with an eNB 105 at similar times. Rather than overloading random access resources, these attempts to exchange data (e.g., requests for control or data resources) may cause an overall traffic load that is too high. The eNB 105 may wish to reduce overall traffic by restricting requests for control or data resources. As such, it has been suggested to extend access controls normally applicable when UEs 115 are in idle mode to situations when UEs 115 are about to initiate an application, but are in the connected state. Extension of access controls to connected state UEs may be called prevention of mobile originated communication (PMOC). However, the impact of UE service requests (e.g., random access or data resource requests) may depend on UE connection state.

Components of the systems 100 or 200, such as the eNBs 105 and UEs 115, may be configured for application category-level access control for random access and traffic ingress using a joint control signal. The joint control signal may include application category access controls as well as an indication of applicability, which may indicate the connection states (e.g., idle state, connected state, etc.) for which the access controls apply. Additionally or alternatively, the indication of applicability may indicate the cause of access control (e.g., PRACH overload, excessive traffic on the eNB 105, etc.). Resources may be conserved by using a single set of application category access controls for UEs in either a connected state, an idle state, or both, and controlling application of the access controls via the indication of applicability. The joint access controls may be transmitted to the UEs using signals 210 such as SIBs.

The indication of applicability may apply to all application category access controls, groups of application category access controls, or there may be separate indication of applicability for each application category access control. The application category access controls may include a barring rate and a mean duration of access control. The barring rate may be a value which affects the probability that an application will be initiated. The barring rate may be binary (e.g., indicate allowed or barred) or it may have numerous different values linked to probabilities of initiation which fall between allowing and barring initiation. If an application is not allowed to initiate it may be barred or it may be deferred. If an application is deferred, it may be deferred for a barring time period that may be determined based at least in part on the mean duration of access control included in the access controls.

Figure 3:
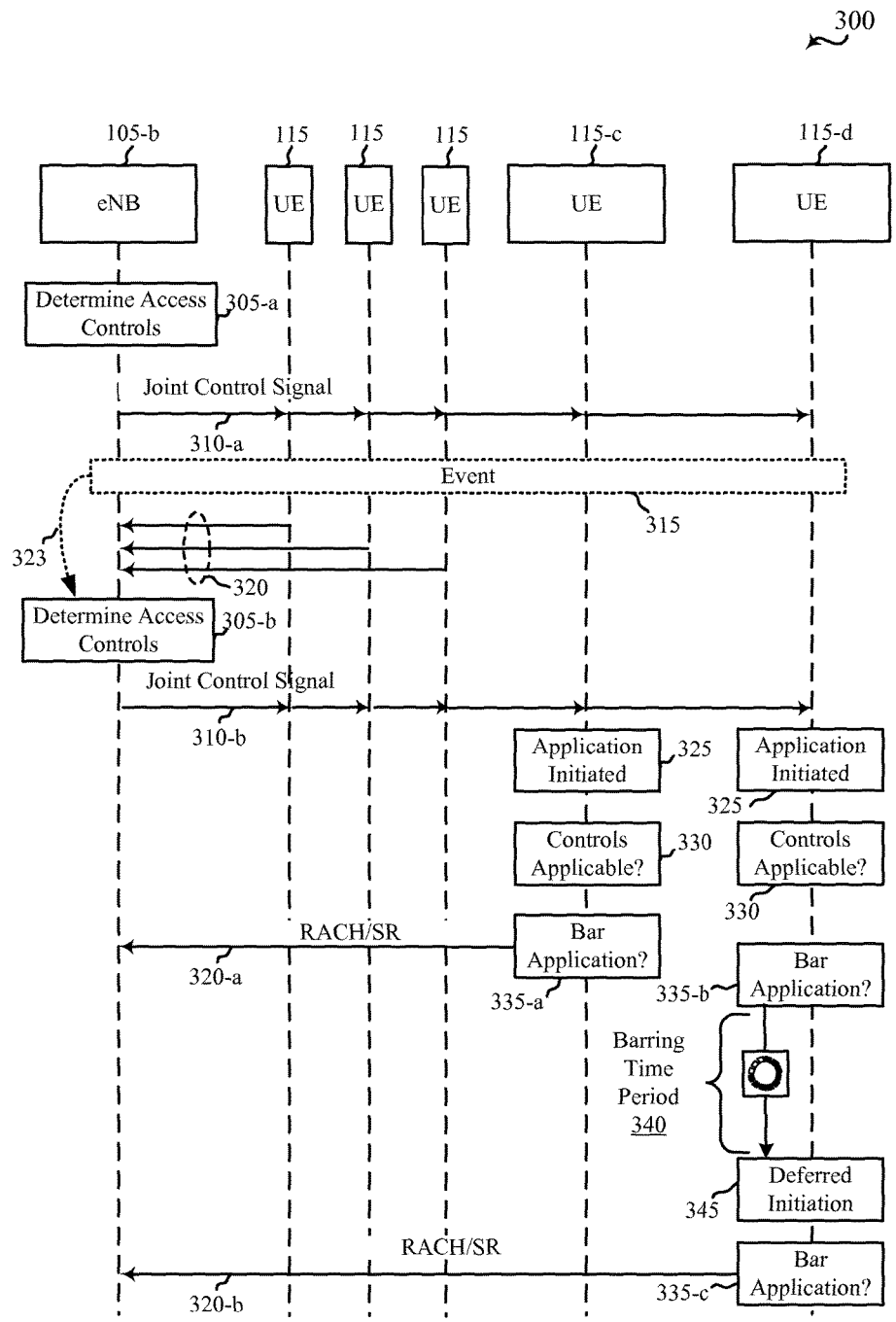
FIG. 3 shows a call flow diagram that illustrates an example of using a joint control signal in a wireless communication system in accordance with various aspects of the disclosure.

Turning now to FIG. 3, a call-flow diagram 300 is shown illustrating access control using a joint control signal in accordance with various aspects of the disclosure. FIG. 3 shows communication between several UEs 115 and an eNB 105-b. In some cases, each of the illustrated UEs 115 may be in the idle state or the connected state prior to the communications illustrated in call-flow diagram 300.

The eNB 105-b may determine access controls for carriers supported by the eNB 105-b at block 305-a. The eNB 105-b may determine the access controls based on a number of factors such as the current load, the available resources, and/or current access requests. The access controls may include multiple application categories. While determining the access controls at block 305-a, the eNB 105-b may further determine an indication of applicability. The access controls may include a barring rate for the application categories and/or a mean duration of access control. The barring rate may be a value which affects the probability that an application will be initiated. In some cases, the indication of applicability is considered a part of the access controls. The indication of applicability may also be transmitted separately from the access controls. Whether transmitted together or separately, the combination of the access controls as well as the indication of applicability may be referred to as a joint control signal.

At the time the access controls are determined by the eNB 105-b at block 305-a, access resources of the carriers supported by the eNB 105-b may have relatively low load. Thus, the eNB 105-b may determine that no access control is needed for access requests (e.g., random access procedures, etc.). Further, overall traffic load at the eNB 105-b may be manageable, or at a low enough level, that the eNB 105-b may determine that no access control is needed for application data from connected state UEs.

Figure 4A:
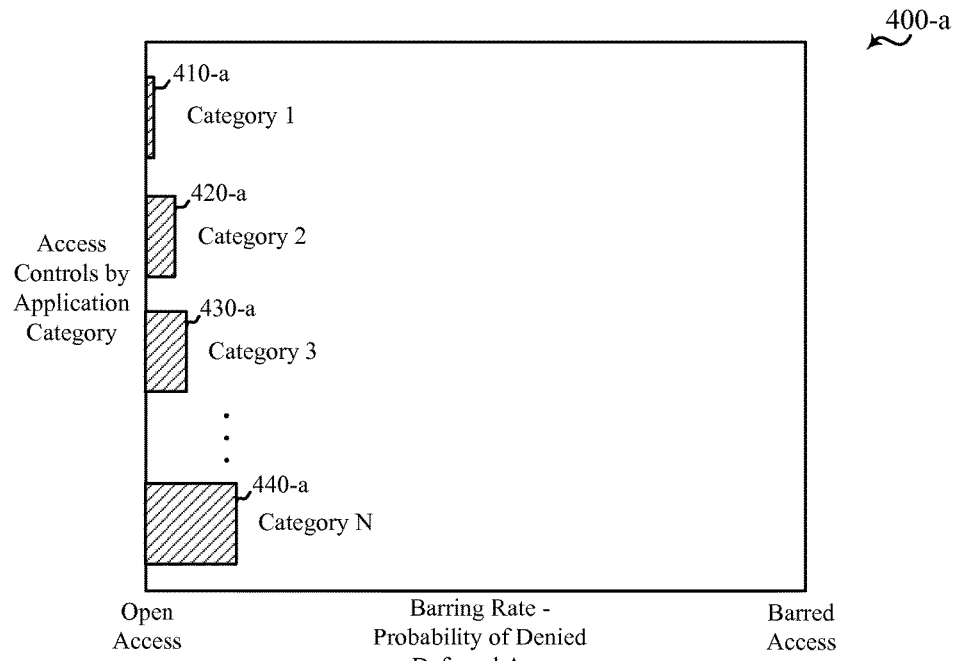
FIGS. 4A and 4B show block diagrams of example access controls in accordance with various aspects of the disclosure.

FIG. 4A may illustrate the access controls generated at block 305-a. As shown in FIG. 4A, there may be N application categories, where N may be any suitable number, such as but not limited to 8, 12, or 16. In some cases, each of the N application categories has a barring rate 410-*a*, 420-*a*, 430-*a*, and 440-*a* associated with it. FIG. 4A illustrates a situation with relatively open access. In FIG. 4A, the application categories have low barring rates 410-*a*, 420-*a*, 430-*a*, and 440-*a* making applications likely to initiate. Although illustrated as non-zero, application categories may have a barring rate, such as a barring rate of zero, allowing open access for initiation of all applications belonging to that application category. FIG. 4A may illustrate a situation where the eNB 105-*b* has access resources (e.g., PRACH resources, etc.) available and is not concerned with barring access requests to conserve the resources for the most critical application categories. Further, FIG. 4A may illustrate a situation where the eNB 105-*b* has data resources available and is not concerned with barring or delaying applications from exchanging data with the eNB 105-*b*.

The eNB 105-*b* may transmit the access controls in a joint control signal 310-*a*. For example, the eNB 105-*b* may transmit the access controls in a broadcast transmission such as a SIB block. The joint control signal 310-*a* may be received and evaluated by many UEs 115, such as all UEs 115 within a coverage area of the eNB 105-*b*.

At block 305-*b*, a high number of access requests 320 (e.g., RACH requests) or requests for transmission resources 320 (e.g., scheduling requests (SR)) may cause the eNB 105-*b* to determine that application category access control should be imposed to reduce overload on resources. For example, a high number of UEs 115 requesting access 320 may cause congestion on access resources for the eNB 105-*b*. In other cases, the eNB 105-*b* may have a high overall traffic load and may have a reduced ability to schedule resources for additional applications of the UEs 115. The eNB 105-*b* may determine new access controls at block 305-*b* based, for example, on an increased number of access requests, an overall traffic load, and/or limited available resources. The access controls determined at block 305-*b* may restrict application initiation more than those determined at block 305-*a*.

In some cases, the type of resource congestion may vary over time. For example, an event 315 (e.g., natural disaster, accident, and the like) may occur. Initially, there may be a surge of access attempts from alarming devices, remote motion sensors, and other kinds of machine type communications (MTC) devices that may cause excessive access request collisions. The eNB 105-*b* may determine an indication of applicability that will indicate to UEs 115 that the access controls are applicable for UEs in the idle state. By doing so, the eNB 105-*b* is able to directly address the number of access requests which may be the cause or potential cause of access resource congestion. Once the access controls for UEs 115 in the idle state are in place, the access requests will disperse and the congestion on the access resources may diminish.

Subsequently, people present in the affected area may start reacting in the aftermath of the event 315, calling or e-mailing loved ones, uploading pictures or video clips from the scene, attempting to find out what is going on by accessing the web; and the like. They are joined by intensity of communication of first responders, in charge of dealing with the effect of the event 315. As a result, overall traffic may go up and congestion of control or data resources (e.g., PDCCH, PDSCH, PUCCH, PUSCH, etc.) may occur, while the physical random access resources may now be relatively uncongested.

The eNB 105-*b* may determine an indication of applicability that will indicate to UEs 115 that the access controls are applicable for UEs in a connected state, since UEs in a connected state may attempt to initiate additional applications, which generally will require additional resources once new applications are initiated. By indicating that UEs in a connected state are subject to access controls and thus preventing the initiation of some applications on UEs in a connected state, the eNB 105-*b* may decrease overall traffic load.

Figure 4B:
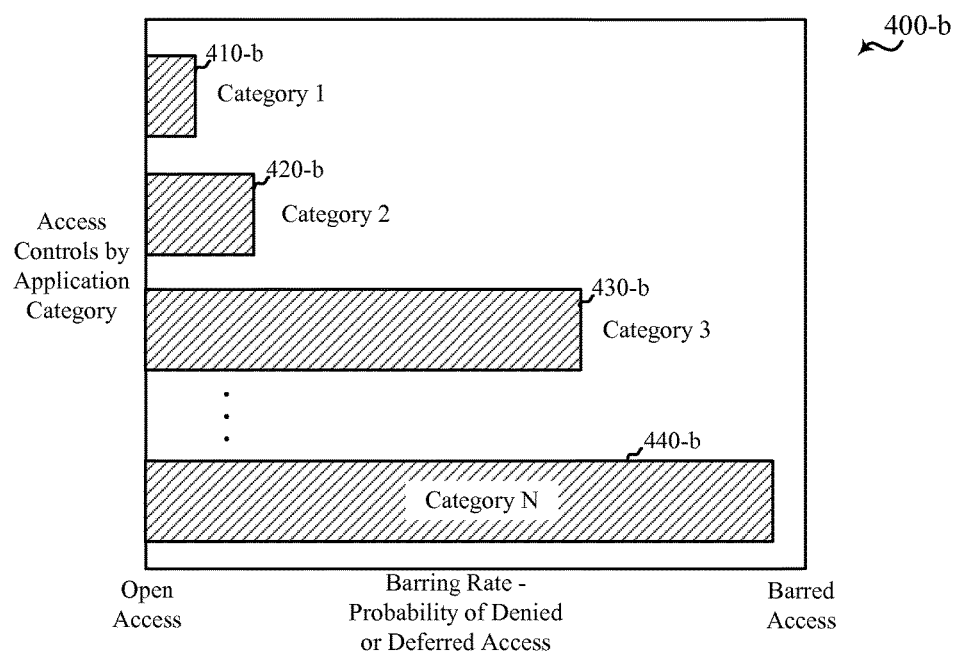

FIG. 3 illustrates that updated access controls are generated at block 305-*b* that apply the application category access controls to UEs in the idle state, UEs in the connected state, or both. FIG. 4B may illustrate the access controls generated at block 305-*b*. As shown in FIG. 4B, many of the N application categories, particularly the lower ranked ones, may have a higher barring rate 410-*b*, 420-*b*, 430-*b*, and 440-*b* associated with it, when compared to the barring rates 410-*a*, 420-*a*, 430-*a*, and 440-*a* of the same category in FIG. 4A. The high barring rate means application initiation from the corresponding category has a high chance of being denied or deferred. This may reduce the number of, or delay, access requests, helping the eNB 105-*b* avoid becoming overloaded. In some cases, high barring rates may limit or reduce overall traffic load by limiting or reducing the amount of application data exchanged with the eNB 105-*b*. In some cases, a change in barring rates between application categories may be related. Alternatively, barring rates of application categories may change independent of one another. For example, lower ranked application categories may have more aggressive access controls imposed, whereas higher ranked application categories may be minimally affected when barring rates are increased.

In some cases, the eNB 105-*b* may determine new access controls based on an indication 323 that an event occurred 315 and that service issues may be expected prior to experiencing a high number of service requests (e.g., access requests and/or resource requests). The indication 323 may be from an emergency warning system, for example. By preemptively determining new access controls, the eNB 105-*b* may avoid issues associated with receiving too many access requests or too much overall traffic.

The eNB 105-*b* may transmit the updated access controls and indication of applicability in another joint control signal 310-*b*. For example, the eNB 105-*b* may transmit the joint control signal in a broadcast transmission (e.g., SIBs, etc.).

UEs 115 may determine an intent to initiate an application at block 325. In some cases, the intent to initiate an application at block 325 may be user input, such as selecting to launch an application. The intent to initiate at block 325 may further be prompted by a timer or another application. In some cases, the intent to initiate at block 325 may be associated with an application for which data communication has already recently occurred (e.g., an open or active application, etc.), but is attempting to initiate further data communications. When an application initiation attempt is made at block 325, the UE 115 may determine if the access controls are applicable at block 330. Determining if the access controls are applicable at block 330 may include checking the indication of applicability. If the UE 115 determines that the indication of applicability indicates that the access controls do not apply to the current state of the UE (not shown), then the UE may perform an access request 320, such as a RACH request, to attempt to establish a connection with the eNB 105-*b* if the UE is in an idle state, or a request for resources 320 for exchanging application data with the eNB 105-*b* if the UE is in a connected state.

If the indication of applicability indicates that the access controls are applicable for the current state of the UE 115, the access controls are determined to be applicable, and the UE 115 will continue evaluating the access controls. UEs, such as UEs 115-*c* and 115-*d*, that determine the access controls are applicable to their current state may determine whether to allow or bar initiation of the application at block 335. As illustrated in FIG. 3, the UE 115-*c* determines at block 335-*a* that initiation of the application should be allowed. Upon allowing the application to initiate, the UE 115-*c* may perform an access procedure (e.g., RACH, etc.) or request resources (e.g., scheduling request (SR), etc.) for the application. For example, the UE 115-*c* may be in an idle state and may transmit an access request 320-*a* to the eNB 105-*b*. In other examples, the UE 115-*c* may be in a connected state and may send a request for resources 320-*a* as a part of the application initiation.

Determining whether to allow or bar initiation of the application at block 335 may be based on the access controls of the joint control signal. In some cases, the UE 115 may determine a random barring number. This random barring number may be compared to the barring rate for the category of the application initiated, such as the barring rate 410-*b*. In some cases, the random barring number determined by the UE 115-*c* is less than the barring rate 410-*b* for the application category. If the random barring number is less than the barring rate 410-*b*, the UE 115-*c* is allowed to initiate the application and transmits an access request or application data 320-*a* to the eNB 105-*b*. In some cases, the UE 115-*c* is allowed to initiate an application because the application it is initiating is a high priority application, such as from category 1.

In contrast, the UE 115-*d* determines that initiation of the application should be barred, or deferred at block 335-*b*. In some cases, the application was barred, or deferred from initiating because the application attempting to initiate belongs to an application category with low priority. In some cases, a random barring rate determined by the UE 115-*d* exceeded the barring rate 430-*b* for the application category and deferred initiation of the application. In some cases, the application is barred from initiation. In other cases, a deferred initiation 345 is performed. The deferred initiation 345 may include attempting to initiate the application, such as by reevaluating the access controls at block 335, after a barring time period 340 has elapsed. In some cases, the deferred initiation 345 waits for an attempt to initiate the application at block 325 after the elapse of the barring time period 340. The barring time period 340 may be determined based on the mean duration of access control included in the joint control signal. In some cases, after elapse of the barring time period 340 the UE 115 will return to determining whether to allow or bar initiation of the application at block 335. After performing the deferred initiation, the UE 115-*d* determines that the application was allowed to initiate at block 335-*c*, which may prompt the UE 115-*d* to send an access request or scheduling request 320-*b* to the eNB 105-*b* for the idle state or connected state, respectively.

Figure 5A:
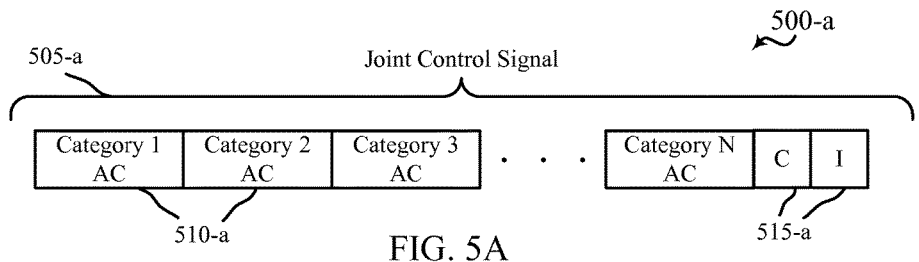
FIGS. 5A, 5B, 5C, 5D, and 5E show block diagrams of example joint control signals in accordance with various aspects of the disclosure.
Figure 5B:
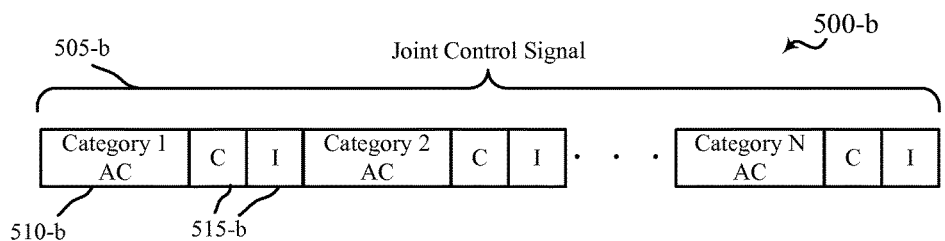
Figure 5C:
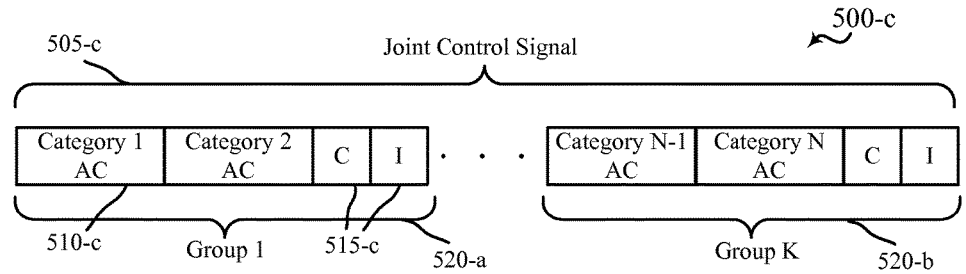

FIGS. 5A, 5B, and 5C show diagrams 500-*a*, 500-*b*, and 500-*c* of example joint control signals for access control in accordance with various aspects of the disclosure. FIGS. 5A, 5B, and 5C show access controls and indications of applicability within a joint control signal. The joint control signal 505 may include access controls 510 for application categories as well as indications of applicability 515 to UE connection states. The joint control signal 505 may be an example of one or more aspects of the joint control signal 310 described with reference to FIG. 3. The indications of applicability 515, access controls 510, and joint control signal 505 may all vary in length and/or structure depending on the system in which they are implemented.

In some cases, the indication of applicability 515 may include one bit indicating applicability of the access controls to the idle state as well as one bit indicating applicability of the access controls to the connected state. Additionally or alternatively, the indication of applicability 515 may include bits indicating whether the predominant cause of controlling access is due to overload of random access resources (e.g., PRACH), or excessive general traffic volume occurring in the eNB 105, or both. In some cases, the indication of applicability 515 is applicable only to newly initiating applications. Applications currently active may not be affected by access control, as it may create a negative user experience, for example disconnecting a current call may be more impactful than barring the initiation of a call. Further, in some regions, freeing resources by forcibly discontinuing an application in progress is not allowed, such as by regulatory bodies. In some examples, the indication of applicability 515 may include one or more bits indicating that the access controls 510 apply to newly initiated applications or active applications, or both. For example, the indication of applicability 515 may include bits indicating that the access controls apply to active applications as well as newly initiated applications. In these instances, even already active applications may be barred according to the access controls 510 from initiating new requests for resources (e.g., sending SR, etc.). The access controls 510 may be a single bit for each application category. At times, the access controls 510 may more bits (e.g., 4 bits, 8 bits, 16 bits, etc.) for each application category.

FIG. 5A shows a diagram of an example joint control signal 505-*a* according to various aspects of the disclosure. The joint control signal 505-*a* includes access controls 510-*a* as well as indications of applicability 515-*a*. In the illustrated example, a plurality of access controls 510-*a* are included in the joint control signal 505-*a*. Further, the joint control signal 505-*a* includes a single indication of applicability that applies for each of the access controls 510-*a*. In some cases, the indication of applicability includes a portion that indicates applicability to UEs in a connected state (C) as well as a portion that indicates applicability to UEs in an idle state (I). The joint control signal 505-*a* may include a number of access controls 510-*a* consistent with the number of application categories. As such, there may be an access control 510-*a* for each application category. While the indication of applicability 515-*a* is shown at the end of the joint control signal 505-*a* it should be appreciated that the indication of applicability 515-*a* could be located before the access controls 510-*a*, after the first access control 510-*a* but before the last access control 510-*a*, or in a disjoint field of the same or a different information block (e.g., SIB, etc.).

FIG. 5B shows a diagram of an example joint control signal 505-*b* according to various aspects of the disclosure. The joint control signal 505-*b* may include access controls 510-*b* as well as indications of applicability 515-*b*. Each indication of applicability 515-*b* may carry indications of whether one access control 510-*b* applies to connected state UEs, idle state UEs, or both. In some cases, there are an equal number of access controls 510-*b* and indications of applicability 515-*b*. The indications of applicability 515-*b* may be located near, such as adjacent to, the access control 510-*b* to which they apply. For example, the indication of applicability 515-*b* for an access control 510-*b* may be located directly before or after the access control 510-*b*. In some cases, the access controls 510-*b* are grouped together contiguously with a contiguous group of indications of applicability 515-*b* preceding or following the grouping of access controls 510-*b*.

FIG. 5C shows a diagram of an example joint control signal 505-c according to various aspects of the disclosure. The joint control signal 505-c may include access controls 510-c as well as indications of applicability 515-c. In some cases, there are more access controls 510-c than there are indications of applicability 515-c and multiple access controls 510-c may form an access control group 520. Each access control group 520 may have an indication of applicability 515-c, which may apply to each access control 510-c of the group 520. Different access control groups 520 may have different numbers of application categories. Access control groups 520 may be structured within joint control signal 505-c in a contiguous or non-contiguous manner. For example, indications of applicability 515-c may directly precede or follow the access controls 510-c to which they apply. In some cases, all of the access controls 510-c are in a contiguous block which is preceded or followed by a contiguous block including the indications of applicability 515-c. For example, it may be known that the first indication of applicability 515-c is associated with the first X access controls 510-c, the second indication of applicability 515-c is associated with the next Y access controls 510-c, and so on (where X and Y are numbers less than the total number of access controls 510-c, N). X may equal Y. In some cases, X does not equal Y.

Figure 5D:
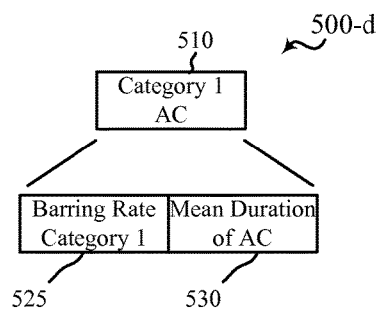
Figure 5E:
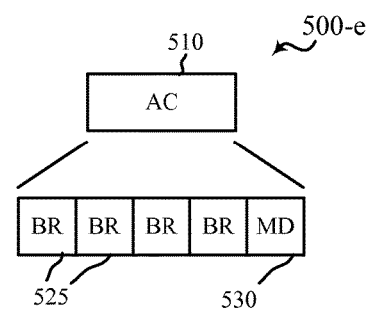

FIGS. 5D and 5E show diagrams 500-d and 500-e of example access controls in accordance with various aspects of the disclosure. FIGS. 5D and 5E show access controls including a barring rate 525 and a mean duration of access control 530. The barring rate 525 may be an example of one or more aspects of the barring rates 410, 420, 430, and/or 440 described with reference to FIG. 4A and/or FIG. 4B. The barring rate 525 and/or the mean duration of access control 530 may be applicable to a single category of access control, or multiple categories of access control, such as all of the categories. The barring rate 525 and/or the mean duration of access control 530 may vary in length and/or structure depending on the system in which they are implemented. In some cases, the barring rate 525 and/or the mean duration of access control 530 may be multiple bits (e.g., 2 bits, 3 bits, 4 bits, 5 bits, etc.). In one example, the barring rate 525 is five bits in length and the mean duration of access control 530 is three bits in length.

FIG. 5D shows a diagram of an example access control according to various aspects of the disclosure. The access control 510 may include a barring rate 525 and/or a mean duration of access control 530. In some cases, an application category access control 510 may include a single barring rate 525 and mean duration of access control 530, each of which may be applicable to the application category.

FIG. 5E shows a diagram of an example access control according to various aspects of the disclosure. The access control 510 may include a barring rate 525 and/or mean duration of access control 530. In some cases, an access control 510 may be applicable to multiple application categories. For example, an access control 510 may include multiple barring rates 525, each of which may indicate a barring rate for an application category. The access control 510 may further include a mean duration of access control 530 which may be applicable to multiple application categories, such as the application categories to which the multiple barring rates 525 of the access control 510 apply.

Figure 6:
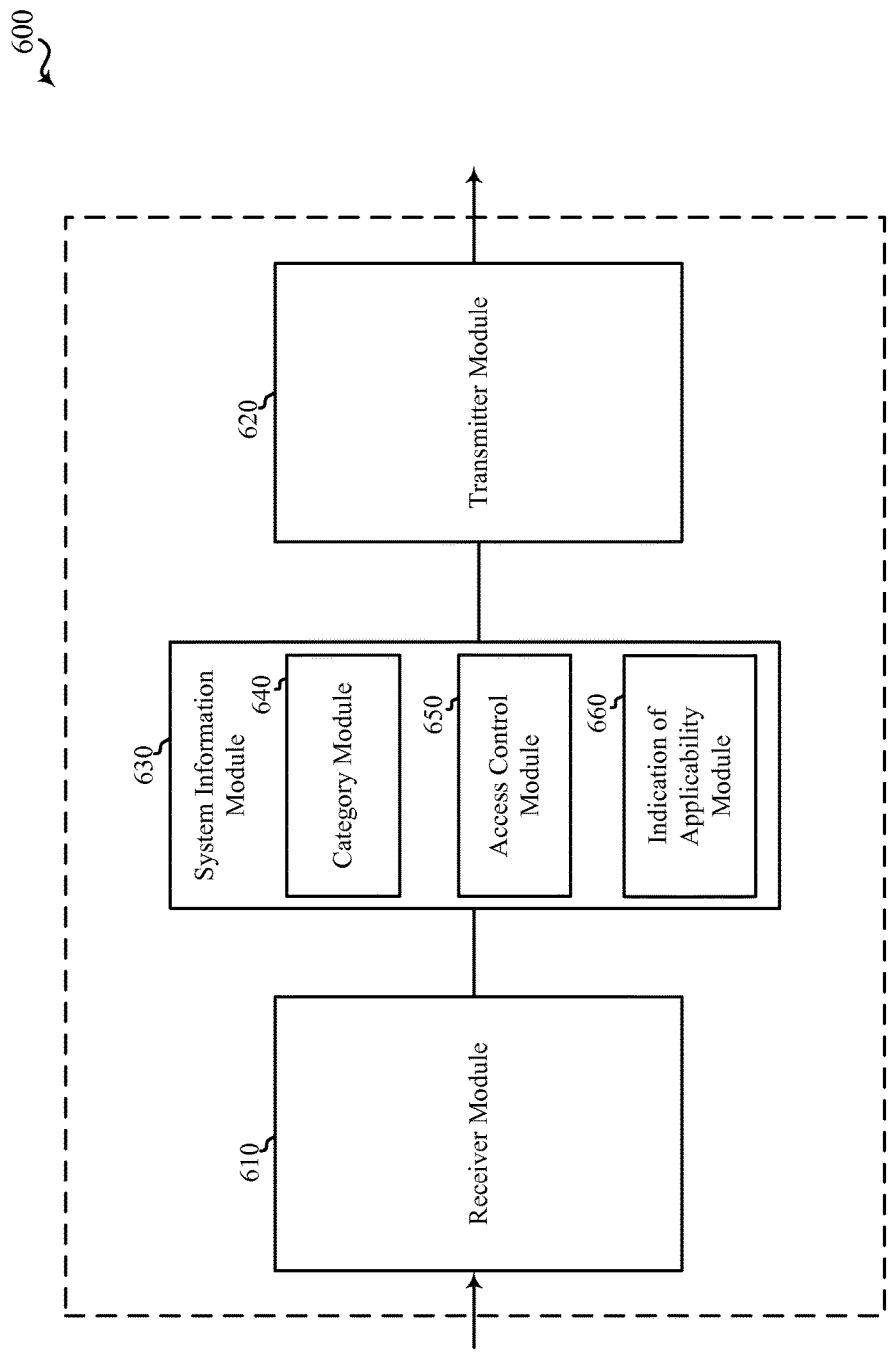
FIG. 6 shows a block diagram of an example device that may be employed in a wireless communications system in accordance with various aspects of the disclosure.

FIG. 6 is a block diagram illustrating an example device 600 that may perform access control using a joint control signal according to various aspects of the disclosure. The device 600 may illustrate, for example, one or more aspects of the eNBs 105 described with reference to FIG. 1, FIG. 2, and/or FIG. 3. In some cases, the device 600 is a processor. The device 600 may include a receiver module 610, a system information module 630, and/or a transmitter module 620. Each of these components may be in communication with each other. In some cases, the receiver module 610 and the transmitter module 620 are a single, or multiple, transceiver module(s). The receiver module 610 and/or the transmitter module 620 may include an integrated processor; they may also include an oscillator and/or a timer. The receiver module 610 may receive signals from UEs 115 and/or other eNBs 105. The receiver module 610 may perform operations, or parts of operations, of the system and call flow described above in FIG. 3, including receiving access requests or scheduling requests 320 and/or receiving application data. The receiver module 610 may be aware of the uplink traffic load of the eNB 105 by virtue of unfulfilled scheduling requests 320. The transmitter module 620 may transmit signals to UEs 115 and/or other eNBs 105. The transmitter module 620 may perform operations, or parts of operations, of the system and call flow described above in FIG. 3, including transmitting joint control signals 310 and/or transmitting application data. The transmitter module 620 may be aware of the downlink traffic load of the eNB 105 by virtue of volume of pending transmissions in the transmission queue of the eNB 105.

The device 600 may include a system information module 630. The system information module 630 may include an integrated processor. The system information module 630 may include a category module 640, an access control module 650, and an indication of applicability module 660. The category module 640 may manage application categories for access control. For example, the category module 640 may track pre-configured, static, or semi-static categories. In some cases, the category module 640 dynamically, or periodically, determines a number of categories and applications that may belong to the categories.

The access control module 650 may perform operations, or parts of operations, of the system and call flow described above in FIG. 3, such as determining application category access controls (e.g., barring rates, mean durations, etc.) for access controls as illustrated by blocks 305. The indication of applicability module 660 may perform operations, or parts of operations, of the system and call flow described above in FIG. 3, such as determining indications of applicability of the application-specific access controls to UEs in different connection states (e.g., idle state, connected state, etc.) for access controls as illustrated by blocks 305. The system information module 630 may transmit a joint control signal including the application category access controls and indication of applicability determined by the access control module 650 and indication of applicability module 660. In some examples, the joint control signal, access controls, and indication of applicability transmitted by the system information module 630 are examples of one or more aspects of the joint control signals 505, access controls 510, and indications of applicability 515 described with reference to FIGS. 5A-5C, respectively.

According to some examples, the components of the device 600 are, individually or collectively, implemented with one or more ASICs adapted to perform some or all of the applicable functions in hardware. In other examples, the functions of device 600 are performed by one or more processing units (or cores), on one or more integrated circuits. In other examples, other types of integrated circuits are used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 7:
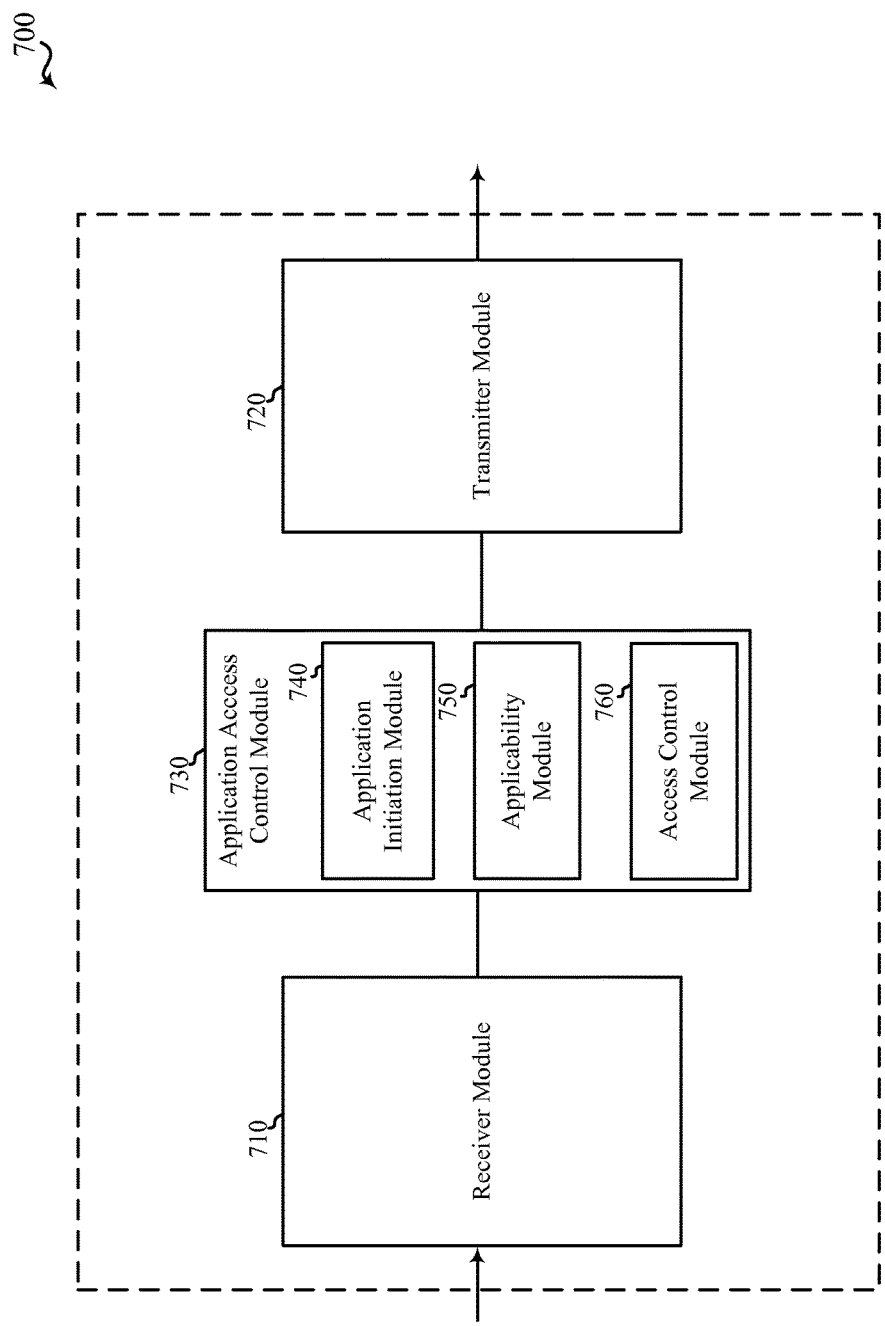
FIG. 7 shows a block diagram of an example device that may be employed in a wireless communications system in accordance with various aspects of the disclosure.

FIG. 7 is a block diagram illustrating an example device 700 that may perform access control using a joint control signal in accordance with various aspects of the disclosure. The device 700 may illustrate, for example, one or more aspects of the UEs 115 described with reference to FIG. 1, FIG. 2, and/or FIG. 3. In some cases, the device 700 is a processor. The device 700 may include a receiver module 710, an application access control module 730, and/or a transmitter module 720. Each of these components may be in communication with each other. In some cases, the receiver module 710 and the transmitter module 720 are a single, or multiple, transceiver module(s). The receiver module 710 and/or the transmitter module 720 may include an integrated processor; they may also include an oscillator and/or a timer. The receiver module 710 may receive signals from other UEs 115 and/or eNBs 105. The receiver module 610 may perform operations, or parts of operations, of the system and call flow described above in FIG. 3, including receiving joint control signals 310 and/or exchanging application data. The transmitter module 720 may transmit signals to other UEs 115 and/or eNBs 105. The transmitter module 720 may perform operations, or parts of operations, of the system and call flow described above in FIG. 3, including transmitting access requests or scheduling requests 320 and/or transmitting application data.

The device 700 may include an application access control module 730. The application access control module 730 may include an integrated processor. The application access control module 730 may include an application initiation module 740, an applicability module 750, and/or an access control module 760.

The application initiation module 740 may perform operations, or parts of operations, of the system and call flow described above in FIG. 3, such as determining initiation of an application 325 and/or a deferred application initiation 345. The applicability module 750 may perform operations, or parts of operations, of the system and call flow described above in FIG. 3, such as determining access control applicability 330. For example, the application access control module 730 may receive a joint control signal including application category access controls and indications of applicability of the access controls to UE connection states (e.g., idle state, connected state, etc.). In some examples, the joint control signal, access controls, and indication of applicability received and processed by the application access control module 730 and applicability module 750 are examples of one or more aspects of the joint control signals 505, access controls 510, and indications of applicability 515 described with reference to FIGS. 5A-5C, respectively. The access control module 760 may perform operations, or parts of operations, of the system and call flow described above in FIG. 3, such as determining whether to allow or bar initiation of an application 335, determining a barring time period 340, and/or a deferred application initiation 345.

According to some examples, the components of the device 700 are, individually or collectively, implemented with one or more ASICs adapted to perform some or all of the applicable functions in hardware. In other examples, the functions of device 700 are performed by one or more processing units (or cores), on one or more integrated circuits. In other examples, other types of integrated circuits are used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 8:
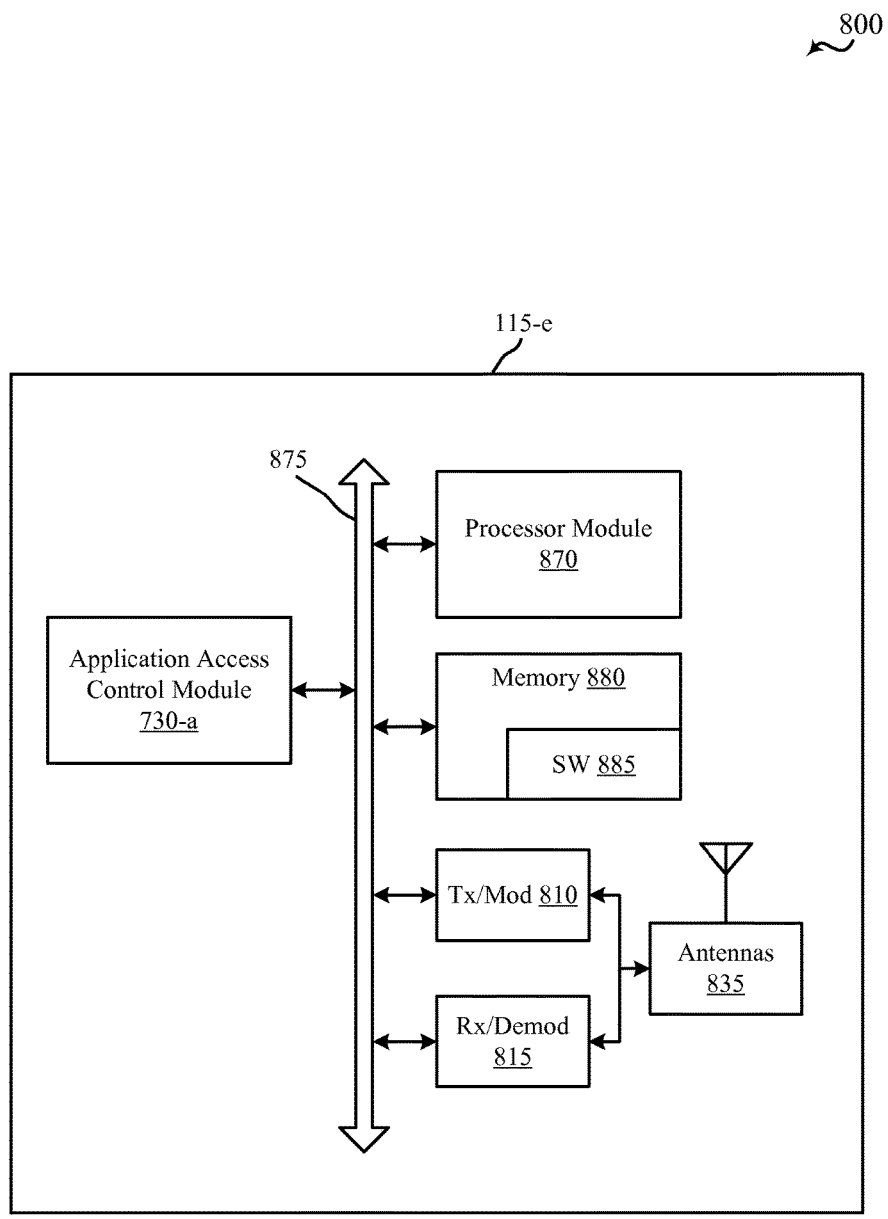
FIG. 8 shows a block diagram of a mobile device configured for using a joint control signal in accordance with various aspects of the disclosure.

FIG. 8 is a block diagram 800 of a mobile device 115-*e* configured for access control using a joint control signal, in accordance with various aspects of the disclosure. The mobile device 115-*e* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*e* may have an internal power supply (not shown), such as a small battery, to facilitate mobile operation. In some cases, the mobile device 115-*e* may an example of the mobile devices 115 of FIG. 1, FIG. 2, FIG. 3, and/or FIG. 7.

The mobile device 115-*e* may generally include components for bi-directional voice and data communications including components for transmitting communications and components for receiving communications. The mobile device 115-*e* may include a processor module 870, a memory 880, transmitter/modulators 810, receiver/demodulators 815, and antennas 835, which each may communicate, directly or indirectly, with each other (e.g., via one or more buses 875). The mobile device 115-*e* may include multiple antennas 835 capable of concurrently transmitting and/or receiving multiple wireless transmissions via transmitter/modulator modules 810 and receiver/demodulator modules 815. For example, the mobile device 115-*e* may have X antennas 835, T transmitter/modulator modules 810, and R receiver/demodulators 815. The transmitter/modulator modules 810 may be configured to transmit signals via one or more of the antennas 835 to eNBs 105. The transmitter/modulator modules 810 may include a modem configured to modulate packets and provide the modulated packets to the antennas 835 for transmission. The receiver/demodulators 815 may be configured to receive, perform RF processing, and demodulate packets received from one or more of the antennas 835. In some examples, the mobile device 115-*e* may have one receiver/demodulator 815 for each antenna 835 (i.e., R=X), while in other examples R may be less than or greater than X. The transmitter/modulators 810 and receiver/demodulators 815 may be capable of concurrently communicating with multiple base stations 105 via multiple MIMO layers and/or component carriers.

According to the architecture of FIG. 8, the mobile device 115-*e* may also include application access control module 730-*a*. By way of example, application access control module 730-*a* may be a component of the mobile device 115-*e* in communication with some or all of the other components of the mobile device 115-*e* via bus 875. Alternatively, functionality of the application access control module 730-*a* may be implemented as a component of the transmitter/modulators 810, the receiver/demodulators 815, as a computer program product, and/or as one or more controller elements of the processor module 870.

The memory 880 may include random access memory (RAM) and read-only memory (ROM). The memory 880 may store computer-readable, computer-executable software/firmware code 885 containing instructions that are configured to, when executed, cause the processor module 870 to perform various functions described herein (e.g., initiating applications, determining applicability, evaluating access controls, requesting access, exchanging application data, etc.). Alternatively, the software/firmware code 885 may not be directly executable by the processor module 870 but be configured to cause a computer (e.g., when compiled and executed) to perform functions described herein.

The processor module 870 may include an intelligent hardware device, e.g., a central processing unit (CPU), a microcontroller, an application-specific integrated circuit (ASIC), etc. The mobile device 115-e may include a speech encoder (not shown) configured to receive audio via a microphone, convert the audio into packets (e.g., 20 ms in length, 30 ms in length, etc.) representative of the received audio, provide the audio packets to the transmitter/modulator module 810, and provide indications of whether a user is speaking.

The mobile device 115-e may be configured to implement aspects discussed above with respect to UEs 115 of FIG. 1, FIG. 2, FIG. 3, and/or FIG. 7, or device 700 of FIG. 7, and may not be repeated here for the sake of brevity. Thus, application access control module 730-a may include the modules and functionality described above with reference to application access control module 730 of FIG. 7. Additionally or alternatively, application access control module 730-a may perform the method 1000 described with reference to FIG. 10 and/or the method 1100 described with reference to FIG. 11.

Figure 9:
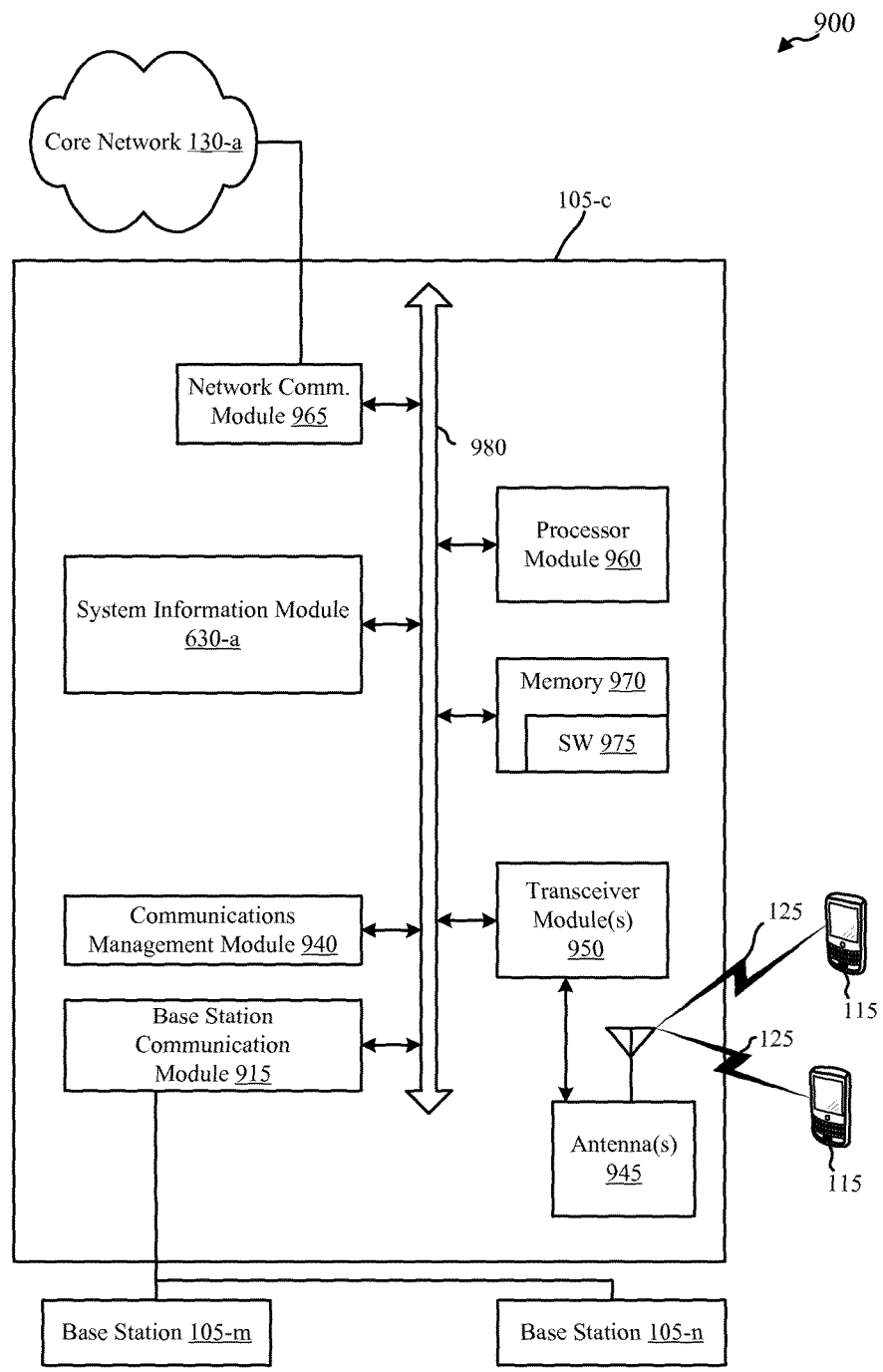
FIG. 9 shows a block diagram of a communications system that may be configured for using a joint control signal in accordance with various aspects of the disclosure.

FIG. 9 shows a block diagram of a communications system 900 that may be configured for access control using a joint control signal in accordance with various aspects of the disclosure. This system 900 may be an example of aspects of the systems 100, 200, or 300 depicted in FIG. 1, FIG. 2, or FIG. 3. The system 900 includes a base station 105-c configured for communication with UEs 115 over wireless communication links 125. Base station 105-c may be capable of communicating over one or more component carriers and may be capable of performing carrier aggregation using multiple component carriers for a communication link 125. Base station 105-c may be, for example, an eNB 105 as illustrated in systems 100, 200, or 300.

In some cases, the base station 105-c may have one or more wired backhaul links. Base station 105-c may be, for example, an LTE eNB 105 having a wired backhaul link (e.g., S1 interface, etc.) to the core network 130-a. Base station 105-c may also communicate with other base stations, such as base station 105-m and base station 105-n via inter-base station communication links (e.g., X2 interface, etc.). Each of the base stations 105 may communicate with UEs 115 using the same or different wireless communications technologies. In some cases, base station 105-c may communicate with other base stations such as 105-m and/or 105-n utilizing base station communication module 915. In some examples, base station communication module 915 may provide an X2 interface within an LTE/LTE-A wireless communication network technology to provide communication between some of the base stations 105. In some cases, base station 105-c may communicate with other base stations through core network 130-a. In some cases, the base station 105-c may communicate with the core network 130-a through network communications module 965.

The components for base station 105-c may be configured to implement aspects discussed above with respect to eNBs 105 of FIG. 1, FIG. 2, and FIG. 3 and device 600 of FIG. 6 and may not be repeated here for the sake of brevity. For example, base station 105-c may include system information module 630-a, which may be an example of system information module 630 of FIG. 6.

The base station 105-c may include antennas 945, transceiver modules 950, memory 970, and a processor module 960, which each may be in communication, directly or indirectly, with each other (e.g., over bus system 980). The transceiver modules 950 may be configured to communicate bi-directionally, via the antennas 945, with the UEs 115, which may be multi-mode devices. The transceiver module 950 (and/or other components of the base station 105-c) may also be configured to communicate bi-directionally, via the antennas 945, with other base stations (not shown). The transceiver module 950 may include a modem configured to modulate the packets and provide the modulated packets to the antennas 945 for transmission, and to demodulate packets received from the antennas 945. The base station 105-c may include multiple transceiver modules 950, each with one or more associated antennas 945.

The memory 970 may include random access memory (RAM) and read-only memory (ROM). The memory 970 may also store computer-readable, computer-executable software code 975 containing instructions that are configured to, when executed, cause the processor module 960 to perform various functions described herein (e.g., call processing, database management, carrier load management, etc.). Alternatively, the software 975 may not be directly executable by the processor module 960 but be configured to cause the computer, e.g., when compiled and executed, to perform functions described herein.

The processor module 960 may include an intelligent hardware device, e.g., a central processing unit (CPU), a microcontroller, an application-specific integrated circuit (ASIC), etc. The processor module 960 may include various special purpose processors such as encoders, queue processing modules, base band processors, radio head controllers, digital signal processors (DSPs), and the like.

According to the architecture of FIG. 9, the base station 105-c may further include a communications management module 940. The communications management module 940 may manage communications with other base stations 105. The communications management module may include a controller and/or scheduler for controlling communications with UEs 115 in cooperation with other base stations 105. For example, the communications management module 940 may perform scheduling for transmissions to UEs 115 and/or various interference mitigation techniques such as beamforming and/or joint transmission.

Figure 10:
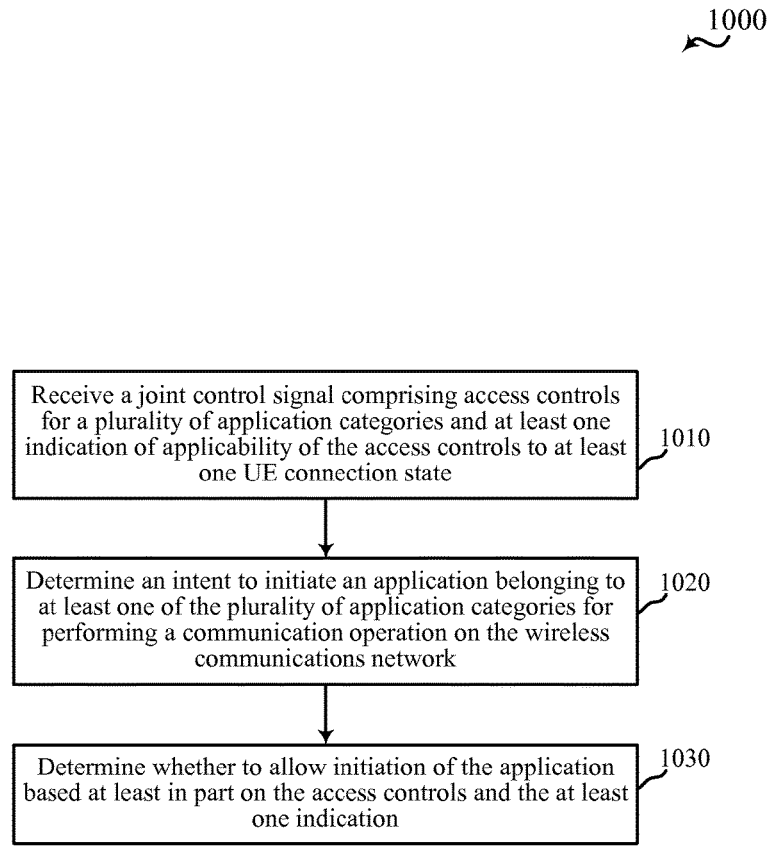
FIG. 10 is a flow chart of a method for processing a joint control signal in accordance with various aspects of the disclosure.

FIG. 10 is a flow chart illustrating an example of a method 1000 for access control using a joint control signal in accordance with various aspects of the disclosure. For clarity, the method 1000 is described below with reference to one of the UEs 115 shown in FIG. 1, FIG. 2, FIG. 3, FIG. 7, or FIG. 8. In one implementation, the application access control modules 730 described with reference to FIG. 7 or FIG. 8 may execute one or more sets of codes to control the functional elements of a UE 115 to perform the functions described below.

At block 1010, the UE 115 may receive a joint control signal comprising access controls for a plurality of application categories and at least one indication of applicability of the application category specific access controls to at least one UE connection state. For example, the indication of applicability may indicate applicability of one or more application category specific access controls to idle state or connected state, or both idle state and connected state. In some examples, the operations at block 1010 are performed by the application access control module 730 of FIG. 7 and/or the device 800 of FIG. 8. In some cases, the joint control signal, access controls, and indication of applicability received at block 1010 are examples of one or more aspects of the joint control signals 505, access controls 510, and indications of applicability 515 described with reference to FIGS. 5A-5C, respectively.

At block 1020, the UE 115 may determine an intent to initiate an application belonging to at least one of the plurality of application categories for performing a communication operation on the wireless communications network. In some examples, the operations at block 1020 are performed by the application access control module 730 of FIG. 7 and/or the device 800 of FIG. 8.

At block 1030, the UE may determine whether to allow or bar initiation of the application based at least in part on the access controls and the at least one indication of applicability. In some examples, the operations at block 1030 are performed by the application access control module 730 of FIG. 7 and/or the device 800 of FIG. 8.

Figure 11:
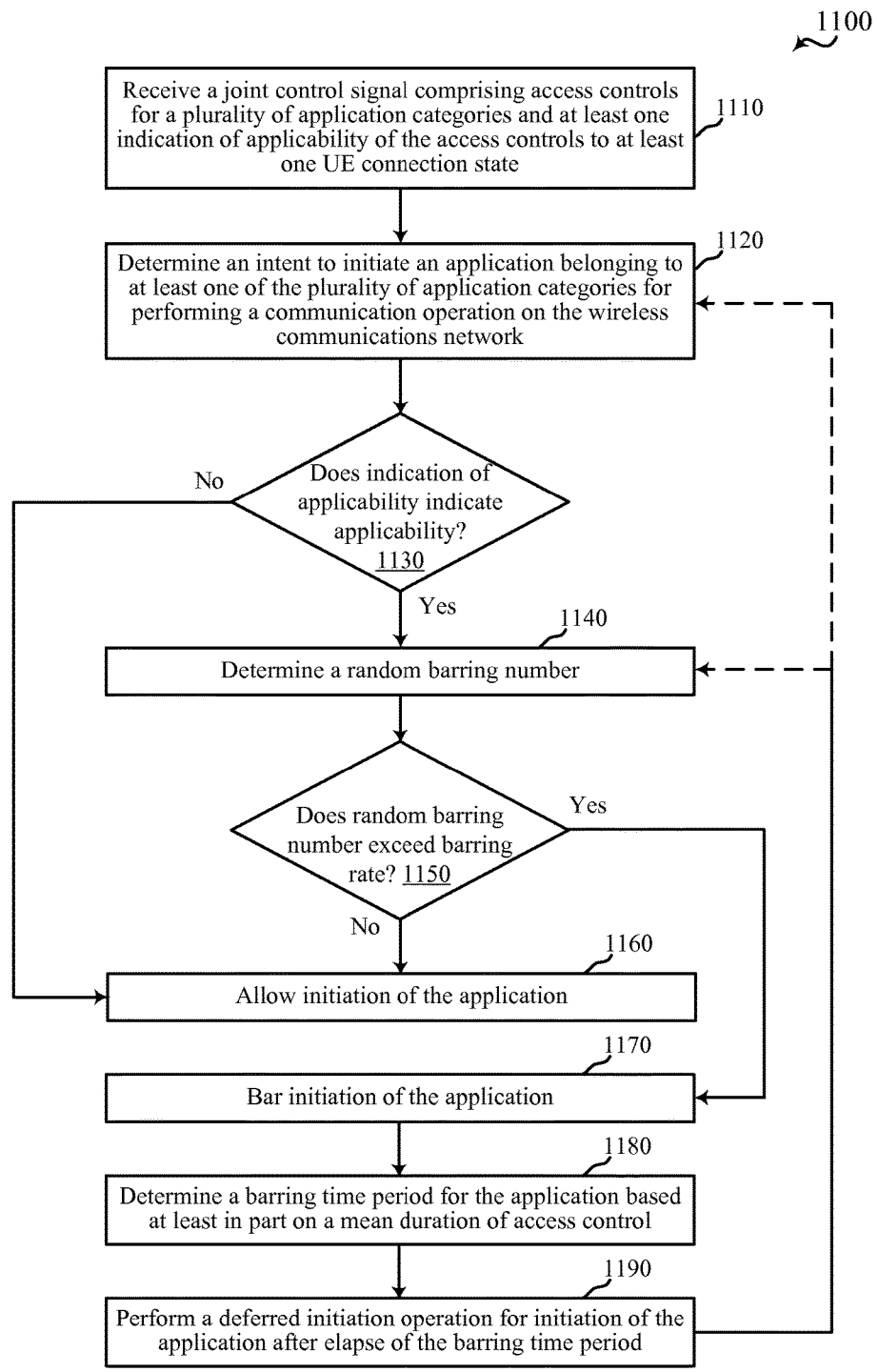
FIG. 11 is a flow chart of a method for processing a joint control signal in accordance with various aspects of the disclosure.

FIG. 11 is a flow chart illustrating an example of a method 1100 for access control using a joint control signal in accordance with various aspects of the disclosure. For clarity, the method 1100 is described below with reference to one of the UEs 115 shown in FIG. 1, FIG. 2, FIG. 3, or FIG. 8. In one implementation, the application access control modules 730 described with reference to FIG. 7 or FIG. 8 may execute one or more sets of codes to control the functional elements of a UE 115 to perform the functions described below.

At block 1110, the UE 115 may receive a joint control signal comprising access controls for a plurality of application categories and at least one indication of applicability of the application category specific access controls to at least one UE connection state. For example, the indication of applicability may indicate applicability of one or more application category specific access controls to idle state or connected state, or both idle state and connected state. In some cases, the operations at block 1110 are performed by the application access control module 730 of FIG. 7 and/or the device 800 of FIG. 8. In some examples, the joint control signal, access controls, and indication of applicability at block 1110 are examples of one or more aspects of the joint control signals 505, access controls 510, and indications of applicability 515 described with reference to FIGS. 5A-5C, respectively.

At block 1120, the UE 115 may determine an intent to initiate an application belonging to at least one of the plurality of application categories for performing a communication operation on the wireless communications network. In some examples, the operations at block 1120 are performed by the application access control module 730 of FIG. 7 and/or the device 800 of FIG. 8.

At block 1130, the UE 115 may determine whether the at least one indication of applicability indicates applicability of an access control associated with an application category for the application for the current UE connection state. If, at block 1130, the UE 115 determines that the at least one indication of applicability indicates non-applicability for an access control associated with an application category for the application for a current UE connection state, the method may advance to block 1160 and allow initiation of the application. In some examples, the operations at block 1130 and/or block 1160 are performed by the application access control module 730 of FIG. 7 and/or the device 800 of FIG. 8.

If, at block 1130, the UE 115 determines that the at least one indication of applicability indicates applicability for an access control associated with an application category for the application for a current UE connection state, the method may advance to block 1140 and determine a random barring number. In some examples, the operations at block 1140 are performed by the application access control module 730 of FIG. 7 and/or the device 800 of FIG. 8.

At block 1150, the UE 115 determines whether to allow or bar initiation of the application based at least in part on the barring rate and the random barring number. If, at block 1150, the UE 115 determines that the random barring number is less than the barring rate for the application category, the method may advance to block 1160 and allow initiation of the application. In some examples, the operations at block 1150 are performed by the application access control module 730 of FIG. 7 and/or the device 800 of FIG. 8.

If, at block 1150, the UE 115 determines that the random barring number exceeds the barring rate for the application category, the method may advance to block 1170 and bar initiation of the application. In some cases, the operations at block 1170 are performed by the application access control module 730 of FIG. 7 and/or the device 800 of FIG. 8.

At block 1180, the UE 115 determines a barring time period for the application based at least in part on the mean duration of access control. In some examples, the operations at block 1180 are performed by the application access control module 730 of FIG. 7 and/or the device 800 of FIG. 8.

At block 1190, the UE 115 performs a deferred initiation operation for initiation of the application after elapse of the barring time period. In some examples, the operations at block 1190 are performed by the application access control module 730 of FIG. 7 and/or the device 800 of FIG. 8. Following block 1190, the method may return to block 1120 or block 1140.

It will be apparent to those skilled in the art that the methods 1000 and 1100 are but example implementations of the tools and techniques described herein. The methods 1000 and 1100 may be rearranged or otherwise modified such that other implementations are possible.

The detailed description set forth above in connection with the appended drawings describes exemplary embodiments and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method performed by a user equipment (UE) in a wireless communications network, the method comprising:

receiving, from a base station of the wireless communications network, a joint control signal comprising access controls for a plurality of application categories and at least one indication of applicability of the access controls to a plurality of UE connection states with the wireless communications network, wherein the plurality of UE connection states comprise a connected state and an idle state;

determining an intent to initiate an application belonging to at least one of the plurality of application categories for performing a communication operation on the wireless communications network; and allowing or barring, at the UE, initiation of the application based at least in part on the access controls, a current UE connection state, and the at least one indication of applicability of the access controls to the plurality of UE connection states.

2. The method of claim 1, wherein allowing or barring initiation of the application comprises:
determining that the at least one indication of applicability indicates applicability of an access control associated with an application category for the application for the current UE connection state; and
determining whether to allow the initiation of the application based at least in part on the access control.

3. The method of claim 2, wherein the access controls comprise a barring rate, a mean duration of access control, or a combination thereof.

4. The method of claim 3, wherein allowing or barring initiation of the application comprises:
determining a random barring number; and
determining to not allow the initiation of the application based on determining that the random barring number exceeds the barring rate for the application category.

5. The method of claim 4, further comprising:
determining a barring time period for the application based at least in part on the mean duration of access control; and
performing a deferred initiation operation for the initiation of the application after elapse of the barring time period.

6. The method of claim 5, wherein the deferred initiation operation comprises:
determining whether to allow the initiation of the application after elapse of the barring time period based at least in part on the access control.

7. The method of claim 3, wherein allowing or barring initiation of the application comprises:
determining a random barring number; and
determining to allow the initiation of the application based on determining that the random barring number is less than the barring rate for the application category.

8. The method of claim 3, wherein the barring rate comprises one set of control bits indicating a barring rate value for the plurality of application categories.

9. The method of claim 3, wherein the barring rate comprises a plurality of sets of control bits each indicating a barring rate value for one of the plurality of application categories.

10. The method of claim 1, wherein allowing or barring initiation of the application comprises:
allowing the initiation of the application based at least in part on determining that the at least one indication of applicability indicates non-applicability for an access control associated with an application category for the application for the current UE connection state.

11. The method of claim 1, wherein the at least one indication of applicability comprises one set of control bits indicating applicability of the access controls to the at least one of the plurality of UE connection states for the plurality of application categories.

12. The method of claim 1, wherein the at least one indication of applicability comprises a plurality of sets of control bits each indicating applicability of the access controls to the at least one of the plurality of UE connection states for one of the plurality of application categories.

13. The method of claim 1, wherein the joint control signal is used for application specific congestion control for data communications (ACDC) and prevention of mobile originated communication (PMOC).

14. The method of claim 1, wherein determining the intent to initiate the application comprises receiving user input indicating the intent to initiate the application.

15. The method of claim 1, wherein the joint control signal is received within a system information block (SIB).

16. A device for wireless communication, comprising:
a processor; and
a memory in electronic communication with the processor, the memory embodying instructions, the instructions being executable by the processor to:
receive, from a base station of a wireless communication network, a joint control signal comprising access controls for a plurality of application categories and at least one indication of applicability of the access controls to a plurality of UE connection states with the wireless communications network, wherein the plurality of UE connection states comprise a connected state and an idle state;
determine an intent to initiate an application belonging to at least one of the plurality of application categories for performing a communication operation on a wireless communications network; and
allow or bar, at the UE, initiation of the application based at least in part on the access controls, a current UE connection state, and the at least one indication of applicability of the access controls to the plurality of UE connection states.

17. The device of claim 16, the memory further embodying instructions being executable by the processor to:
determine that the at least one indication of applicability indicates applicability of an access control associated with an application category for the application for the current UE connection state; and
determine whether to allow the initiation of the application based at least in part on the access control.

18. The device of claim 17, wherein the access controls comprise a barring rate, a mean duration of access control, or a combination thereof.

19. The device of claim 18, the memory further embodying instructions being executable by the processor to:
determine a random barring number; and
determine to not allow the initiation of the application based on determining that the random barring number exceeds the barring rate for the application category.

20. The device of claim 19, the memory further embodying instructions being executable by the processor to:
determine a barring time period for the application based at least in part on the mean duration of access control; and
perform a deferred initiation operation for the initiation of the application after elapse of the barring time period.

21. The device of claim 18, the memory further embodying instructions being executable by the processor to:
determine a random barring number; and
determine to allow the initiation of the application based on determining that the random barring number is less than the barring rate for the application category.

22. The device of claim 16, the memory further embodying instructions being executable by the processor to:
allow the initiation of the application based at least in part on determining that the at least one indication of applicability indicates non-applicability for an access control associated with an application category for the application for the current UE connection state.

23. An apparatus for wireless communication, comprising:
- means for receiving, from a base station of the wireless communications network, a joint control signal comprising access controls for a plurality of application categories and at least one indication of applicability of the access controls to a plurality of UE connection states with the wireless communications network, wherein the plurality of UE connection states comprise a connected state and an idle state;
- means for determining an intent to initiate an application belonging to at least one of the plurality of application categories for performing a communication operation on the wireless communications network; and
- means for allowing or barring, at the UE, initiation of the application based at least in part on the access controls, a current UE connection state, and the at least one indication of applicability of the access controls to the plurality of UE connection states.

24. The apparatus of claim 23, wherein the means for allowing or barring initiation of the application:
- determines that the at least one indication of applicability indicates applicability of an access control associated with an application category for the application for the current UE connection state; and
- determines whether to allow the initiation of the application based at least in part on the access control.

25. The apparatus of claim 24, wherein the access controls comprise a barring rate for the plurality of application categories, a mean duration of access control, or a combination thereof.

26. The apparatus of claim 25, wherein the means for allowing or barring initiation of the application:
- determines a random barring number; and
- determines to not allow the initiation of the application based on determining that the random barring number exceeds the barring rate for the application category.

27. The apparatus of claim 25, wherein the means for allowing or barring initiation of the application:
- determines a random barring number; and
- determines to allow the initiation of the application based on determining that the random barring number is less than the barring rate for the application category.

28. The apparatus of claim 23, wherein the means for allowing or barring initiation of the application allows the initiation of the application based at least in part on determining that the at least one indication of applicability indicates non-applicability for an access control associated with an application category for the application for the current UE connection state.

29. A computer program product for wireless communication, comprising:
- a non-transitory computer-readable medium, comprising code for:
  - receiving, from a base station of the wireless communications network, a joint control signal comprising access controls for a plurality of application categories and at least one indication of applicability of the access controls to a plurality of UE connection states with the wireless communications network, wherein the plurality of UE connection states comprise a connected state and an idle state;
  - determining an intent to initiate an application belonging to at least one of the plurality of application categories for performing a communication operation on the wireless communications network; and
  - allowing or barring, at the UE, initiation of the application based at least in part on the access controls, a current UE connection state, and the at least one indication of applicability of the access controls to the plurality of UE connection states.

* * * * *